United States Patent [19]

Riggio, Jr.

[11] Patent Number: 5,355,100
[45] Date of Patent: Oct. 11, 1994

[54] BATTERY POWERED MAGNETIC PEN WITH TIME OUT TO PREVENT ACCIDENTAL BATTERY DISCHARGE

[75] Inventor: Salvatore R. Riggio, Jr., Boca Raton, Fla.

[73] Assignee: International Business Machines Corporation, Armonk, N.Y.

[21] Appl. No.: 3,084

[22] Filed: Jan. 11, 1993

[51] Int. Cl.$^5$ .............................................. H03B 1/00
[52] U.S. Cl. ..................... 331/173; 331/65; 331/68; 331/185; 331/187; 345/179
[58] Field of Search ............... 331/55, 65, 68, 112, 331/117 R, 117 FE, 173, 179, 187, 185; 178/18, 19, 20; 345/169, 179

[56] References Cited

U.S. PATENT DOCUMENTS

| | | | |
|---|---|---|---|
| 3,033,994 | 5/1962 | Fujimoto et al. | 307/88.5 |
| 3,504,334 | 3/1970 | Turnage, Jr. | 340/16 |
| 3,808,466 | 4/1974 | Campbell | 307/293 |
| 4,227,044 | 10/1980 | Fencl | 178/19 |
| 4,268,730 | 5/1981 | Higgins et al. | 200/52 R |
| 4,883,926 | 11/1989 | Baldwin | 178/18 |
| 5,122,623 | 6/1992 | Zank et al. | 178/19 |
| 5,138,118 | 8/1992 | Russell | 178/19 |

Primary Examiner—David Mis
Attorney, Agent, or Firm—George E. Grosser; Douglas R. McKechnie

[57] ABSTRACT

A battery-powered magnetic pen has an oscillator for generating a magnetic field at a contact frequency and a proximity frequency. The oscillator is connected to a resettable timer. The pen also includes a tip switch that is actuated in response to the pen being brought into engagement with an object and disengaged from the object. The tip switch is connected to a pulse generator and to the oscillator. Each time the pen is brought into engagement with an object, the pulse generator resets the timer to initiate the timing of a time out period. Assuming the oscillator is off, the first time the pen contacts an object, the resetting causes the oscillator to be turned on. So long as the oscillator is on, the opening and closing of the tip switch causes the oscillator to switch between the contact frequency and the proximity frequency. Should the timer reach the end of a predetermined time out period, the oscillator is shut off. Thus, if the tip switch is continuously actuated for the time out period, such as might occur due to improper storage of the pen, the oscillator is shut off to prevent the battery from becoming discharged.

7 Claims, 2 Drawing Sheets

BATTERY POWERED MAGNETIC PEN WITH TIME OUT TO PREVENT ACCIDENTAL BATTERY DISCHARGE

RELATED APPLICATION

The following application is assigned to the assignee of this application and is related hereto:

"MAGNETIC PEN BATTERY POWERED OSCILLATOR", by S. R. Riggio Jr., filed on even date herewith, Ser. No. 08/003,083.

BACKGROUND OF THE INVENTION

This invention relates to improvements in cordless, battery operated pens for inputting data and information into a tablet computer. More specifically, the invention relates to a pen having improved circuitry for preventing accidental discharge of the pen battery.

Cordless and untethered magnetic pens are known in the prior art, which are used to input data into a tablet computer. One such pen emits a modulated radio frequency (RF) field that is received and demodulated by electronics with the tablet computer. The detected field is used by the system software to determine the location of the pen with respect to a magnetic grid thereby allowing a user to input data into the computer. The pen includes a normally closed switch and an oscillator that oscillates at two different frequencies dependent on whether the switch is open or closed, and the oscillator controls the frequency of the RF field emitted by the pen. The switch is located at the tip of the pen and is sometimes referred to as a "tip switch".

When the tip of the pen is moved into contact with an object such as the magnetic grid, two events occur. First, the switch opens and an oscillator is turned on to operate at a frequency signifying that the pen is in contact with the grid. Second, a time out circuit is enabled or engaged to limit the time that battery power is applied to the oscillator. This time limit is reset each time the pen tip comes into contact with the grid. However, if the tip switch is compressed in a fixed position, such as is possible when the pen is stored in a user's pocket, a drawer, a briefcase, etc., the time out circuit is rendered ineffective and the battery applies continuous power to the oscillator. This action causes the battery to be completely discharged in a short period. Without a recharge mechanism, the discharged battery must be replaced.

SUMMARY OF THE INVENTION

One of the objects of the invention is to provide a battery-powered magnetic pen with an improved time out circuit that prolongs battery life by preventing accidental discharge of the battery.

Another object of the invention is to provide a battery-powered magnetic pen which is automatically turned off after the lapse of a predetermined period not only after the user has ceased using the pen but also after when the pen tip has been continuously compressed for such period.

A further object of the invention is to provide a battery-powered magnetic pen, having a tip switch that turns on an oscillator and modulates a magnetic field to signify when the pen is in contact with or in proximity to a magnetic grid, with an improved time out circuit that automatically turns the power off to the oscillator in the event the tip switch is actuated continuously for a predetermined period.

Still another object of the invention is to provide a magnetic pen having a time out circuit in which an impulse generator is actuated each time a tip switch is opened, to initiate a new time out period.

Briefly, in accordance with the invention, a battery-powered magnetic pen has an oscillator for generating a magnetic field at a contact frequency and a proximity frequency. The oscillator is connected to a resettable timer that controls the on/off operation of the oscillator. The pen also includes a tip switch that is actuated in response to the pen being brought into engagement with an object and disengaged from the object. The tip switch is connected to a pulse generator and to the oscillator. Each time the pen is brought into engagement with an object, the pulse generator resets the timer to initiate the timing of a time out period. Assuming the oscillator is off, the first time the pen contacts an object, the resetting causes the oscillator to be turned on. So long as the oscillator is on, the opening and closing of the tip switch causes the oscillator to switch between the contact frequency and the proximity frequency. Should the timer reach the end of a predetermined time out period, the oscillator is shut off. Thus, if the tip switch is continuously actuated for the time out period, such as might occur due to improper storage of the pen, the oscillator is shut off to prevent the battery from becoming discharged.

DRAWINGS

Other objects and advantages of the invention will be apparent from the following description taken in connection with the accompanying drawings wherein.

DETAILED DESCRIPTION

Figure 1:
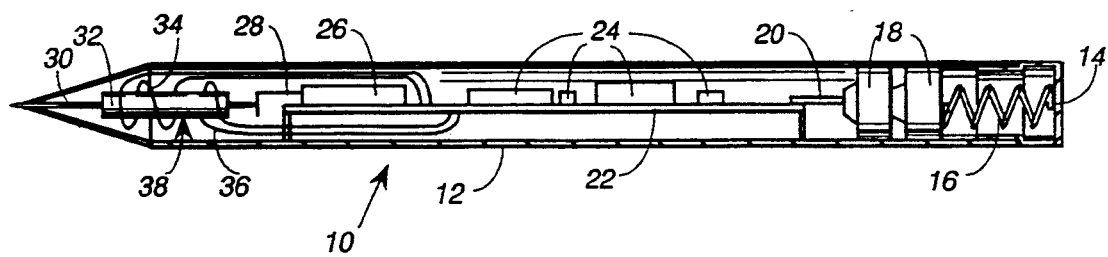
FIG. 1 is a simplified longitudinal view, with casing portions removed, of a magnetic pen in accordance with the invention.

Referring now to the drawings, and first to FIG. 1, there is shown an untethered, cordless magnetic pen 10 that is usable with a tablet computer (not shown) for inputting data into the computer. Pen 10 comprises a casing 12 of a size adapted to be hand held and manually manipulated thereby allowing the user to use the pen in a manner similar to using an ordinary writing pen. Casing 12 is hollow, and tubular and is open at one end to receive a cap 14. The cap biases a spring 16 against a two cell battery 18 which in turn abuts a contact 20 for supplying power from the battery to electronic components 24 mounted on a printed circuit board (PCB) 22. The positive side of battery 18 is electrically connected through spring 16 to casing 12 while the negative side forms a ground for the circuitry.

A single-pole, single-throw, normally-closed microswitch 26 is also mounted on PCB 22 and has a longitudinally movable actuating rod 28 engaged with the inner end of a longitudinally movable rod 30. A spring (not shown) within switch 26 biases rods 28 and 30 longitudinally outwardly against a stop means (not shown) whereby the outer end or tip of rod 30 projects outwardly from casing 12 for engagement with the magnetic grid of the computer. When the pen is brought into engagement or contact with an object such as the grid of the tablet computer, rod 30 is moved longitudinally inwardly against rod 28 and actuates switch 26 causing it to open. When the pen is subsequently disengaged from the grid, the spring bias within switch 26 causes the switch to close and also returns rods 28 and 30 to their normal, unactuated positions.

Figure 2:
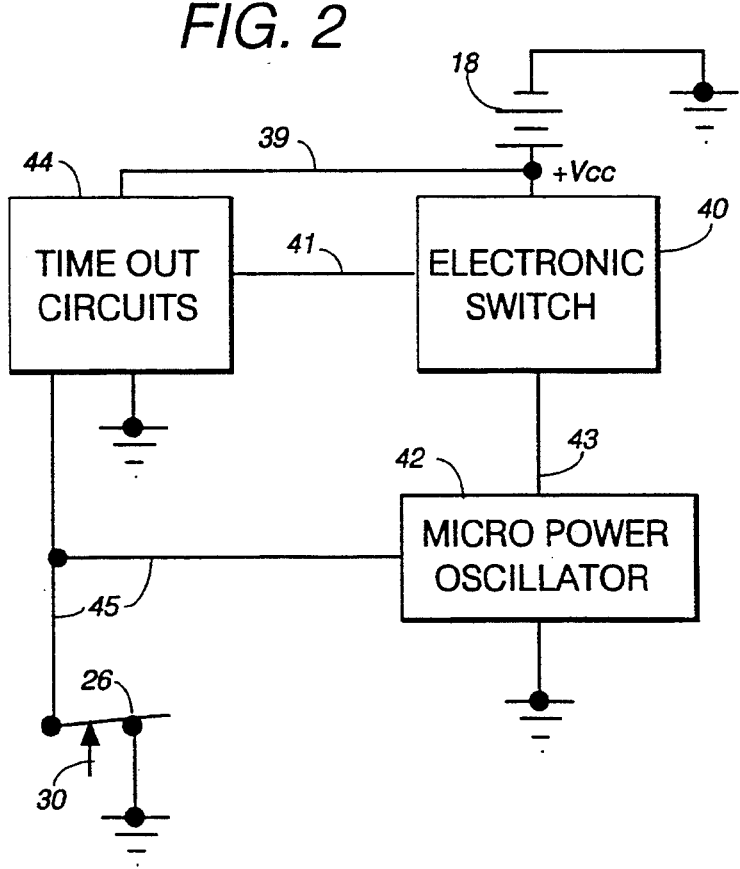
FIG. 2 is a block diagram of circuitry included in the pen shown in FIG. 1.

Also included in pen 10 is a stationary, tubular magnetic core 32 through which rod 30 freely passes. Two inductor coils 34 and 32 are wrapped around core 32 to form a transformer 38 that is part of an oscillator 42 (FIG. 2). The transformer generates a magnetic field that extends longitudinally outwardly from the tip of the casing and is detectable by the magnetic grid of the tablet computer.

Referring to FIG. 2, battery 18 supplies a +Vcc power supply voltage over power line 39 to a normally open electronic switch 40 and to time out circuits 44 which provide actuating signals over line 41 for controlling the switching operation of switch 40. A micro power oscillator 42 is connected by line 43 to receive +Vcc power when switch 40 is closed. Time out circuits 44 are further connected by a line 45 to one side of switch 26, the other side of which is grounded. Line 45 is also connected to oscillator 42. The details of oscillator are shown and described in the above-identified related application.

The general operation of the circuit shown in FIG. 2 is as follows. Assume at the start that tip 30 is disengaged from any external object. In such a situation, switch 26 is closed, switch 40 is open, and oscillator 42 is off. When the tip 30 of pen 10 is brought into engagement with the grid, switch 26 is opened. In response to the opening of switch 26, time out circuits 44 send a signal on line 41 causing switch 40 to close and thereby supply +Vcc power to oscillator 42 causing it to oscillate at a first frequency signifying engagement with the grid. When switch 40 is closed, oscillator 42 oscillates at two different frequencies dependent on whether switch 26 is open or closed. The first frequency is a "contact" frequency signifying that the pen is engaged with the grid. The second frequency is a "proximity" frequency for detecting when the pen is close to the grid. Thus, as a user manipulates the pen relative to the grid moving it alternately between engaged and disengaged positions, switch 26 is alternately opened and closed causing the oscillator to shift or modulate frequencies between the contact frequency and the proximity frequency. The time out circuits 44 operate to keep switch 40 closed so long as the pen has not been continuously engaged with or disengaged from the grid for more than a predetermined time out period. Should the pen remain engaged or disengaged continuously for a period greater than the time out period, switch 40 is opened thus shutting off oscillator 42. The time out circuit requires pen up and pen down action within the time out period to insure that switch 40 remains closed thereby allowing the oscillator to continue emitting the RF field during normal usage with the tablet computer. A time out period of about one minute is suitable and conserves battery power by shutting off the oscillator. The time out circuits also prevent accidental battery discharge in the manner described below.

Figure 3:
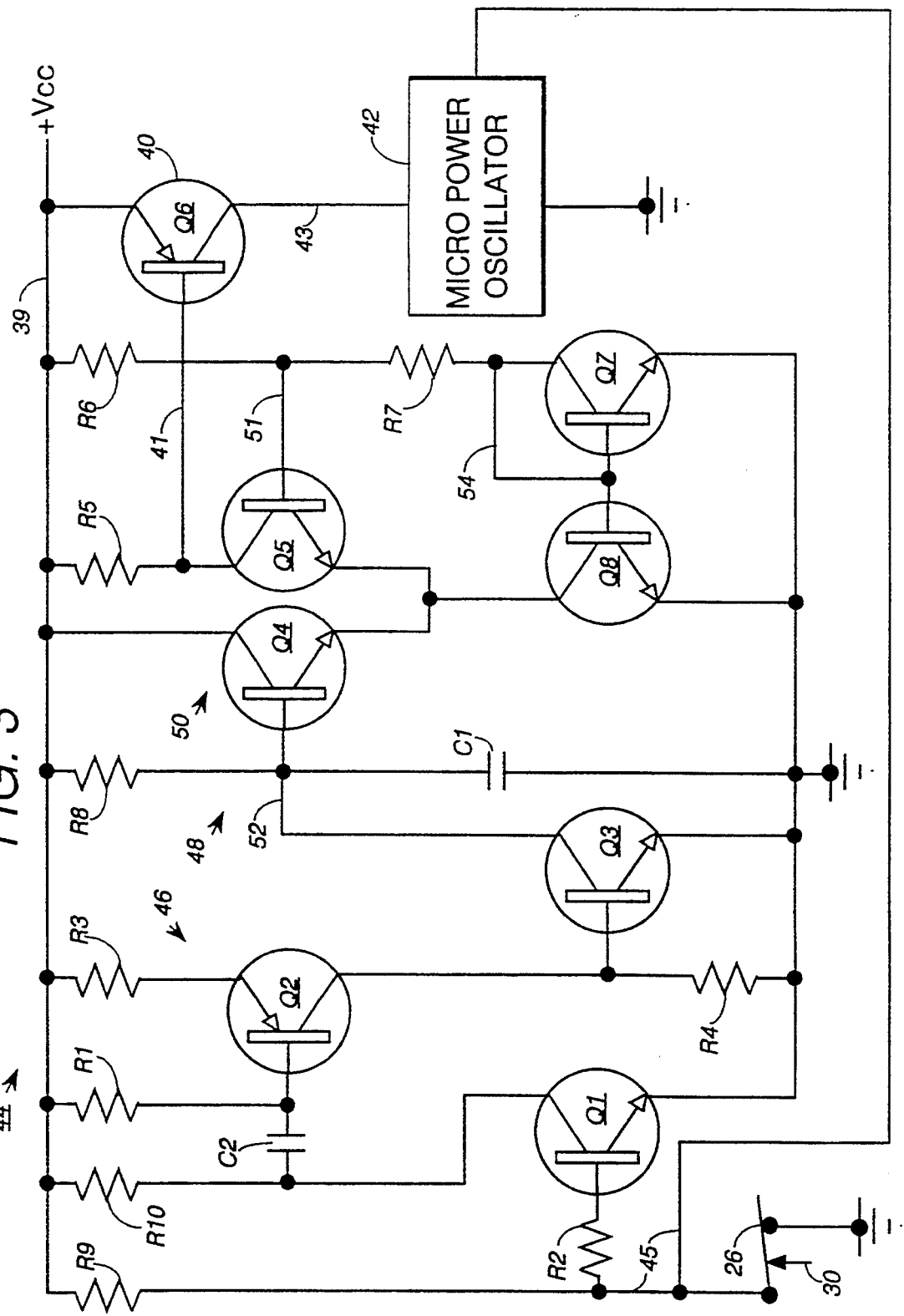
FIG. 3 is a detailed circuit diagram of the time out circuits shown in FIG. 2.

With reference to FIG. 3, circuits 44 comprises two sections, a pulse generator section 46 that is connected to tip switch 26, and a time out section 48 that is connected to switch 40. The combination of section 48 and switch 40 form a timer for controlling the on/off operation of oscillator 42. There are eight transistors Q1-Q8 shown in FIG. 3. Q2 and Q6 are PNP transistors, and the remaining ones are NPN transistors. Q6 forms electronic switch 40 and has its emitter connected to the power supply +Vcc and its collector connected by line 43 to oscillator 42. When Q6 is turned on, the oscillator is on, and when Q6 is off, the oscillator is off. The base of Q6 is connected by line 41 to time out section 48 whereby the switching operation of Q6 is controlled by section 48.

Transistors Q4 and Q5 form part of a difference amplifier 50 which has two input lines 51 and 52, and an output line 41. Amplifier 50 is mirror biased by matched transistors Q7 and Q8. Resistors R6 and R7 are connected in series with the collector of Q7, the adjacent ends of the resistors being connected to line 51 to provide a reference voltage input to the base of Q5. A conductor 54 connects the collector of Q7 to the bases of Q7 and Q8. The collector of Q8 is connected to the emitters of Q4 and Q5. The emitters of Q8 and Q7 are connected to ground. Q7 and Q8 are always on so long a +Vcc is supplied. R6 and R7 control the collector current through Q7 and provide a bias to the bases of Q7 and Q8 whereby the current in Q8 is the same as that in Q7.

The collector of Q5 is connected by conductor 41 to R5 and to the base of Q6. The collector of Q4 is connected directly to power supply line 39. The base of Q4 is connected by input line 52 to R8, capacitor C1, and the collector of Q3. Capacitor C1 and resistor R8 provide a relatively long time constant of about one minute, and establish or predetermine the length of a time out period. C1 has one side connected to ground, the other side being connected to the power supply through R8 so that the capacitor can be charged when Q3 is off. Transistor Q3 is operated as a switch under the control of pulse generator 46, to momentarily short both sides of capacitor C1 and thereby discharge the capacitor in response to a pulse input to Q3.

Impulse generating section 46 comprises transistors Q1, and Q2. Q1 has its base connected through R2 and R9 to the power supply. R2 and R9 are also connected to line 45 and tip switch 26. The emitter of Q1 is grounded, while its collector is connected through R10 to the power supply. The collector is also connected to one side of capacitor C2. The other side of C2 is connected to the base of Q2 and through R1 to line 39. The emitter of Q2 is connected through R3 to line 39, while the collector is connected to the base of Q3 and through R4 to ground. Q1 is operated as a switch that inversely follows switch 26. When switch 26 is closed, Q1 is open (off), and when 26 is open, Q1 is closed (on). Capacitor C2 generates a spike when Q1 closes and thereby momentarily turns Q2 on for a period determined by the capacitance of C2.

The operation will now be described. It is assumed at the start that tip switch 26 is closed, and switch 40 is open so that oscillator 42 is off. Under such circumstances, transistors Q4, Q7, and Q8 are on while the remaining transistors are off. Also, capacitor C1 is fully charged to the voltage level of the power supply line 39. When switch 26 is opened, e.g., due to pen tip 30 coming in contact with the grid, transistor Q1 is turned on into saturation thereby sending an impulse through capacitor C2 to the base of transistor Q2. This impulse momentarily switches transistor Q2 on, allowing current through its collector for a short period. Such current flow creates a voltage pulse at the base of Q3 which switches Q3 on for the length of the pulse. The pulse width is determined by the time constant of capacitor C2 and is sufficienly long to enable capacitor C1 to be discharged. When Q3 is switched on, the charge on capacitor C1 flows through Q3 to ground thereby discharging the capacitor. In the meantime, capacitor C2 returns to its normal charge and Q2 is switched off, which causes Q3 to switch off thereby allowing C1 to recharge. The discharge of C1 imbalances difference amplifier 50 thereby switching Q5 on, and the resultant voltage drop across R5 switches Q6 on thereby turning oscillator 42 on. Thus, the initial opening of switch 26 generates an impulse that turns on the oscillator and initiates a time out period. When C1 recharges to a voltage level above the reference voltage, Q5 is turned off thereby turning off Q6 and oscillator 42.

When a user is inputting data into the computer, the pen is normally lifted off the grid and placed back on the grid many times in succession. Each time the pen is placed on the grid, capacitor C1 is discharged to initiate a new time out period. When the user is finished entering data and the tip is no longer being compressed, the time out period expires, and the oscillator is shut off to conserve battery drain.

If the pen tip is compressed in a fixed position, no more impulses can be transmitted to transistor Q2 through capacitor C2, and Q3 remains off thereby allowing capacitor C1 to charge through resistor R1 (the preset time limit) to a voltage level that is higher than the reference value. Power is thus removed from the oscillator until the tip switch is disengaged (closed) and then re-engaged, which then restarts the process and re-applies the battery power to the oscillator for another preset period of time. Therefore, the pen battery can not be completely discharged through accidental or improper storage in which the tip is compressed and tip switch is opened.

In comparison, the prior art pen, discussed above in the Background of Invention section, lacked a pulse generator. Instead, the prior art device included a transistor switch for discharging the timing capacitor. The transistor switch was operated inversely to operation of the tip switch, so that if the tip switch was open, the transistor switch was closed and the capacitor would not recharge, with the result the oscillator continued running. If the tip switch were jammed open, the battery would discharge. Also, the time out period did not start until the pen was lifted to close the tip switch thereby opening the transistor switch allowing the timing capacitor to charge. If the tip switch were not actuated again, the oscillator was shut off after lapse of the time out period.

It should be apparent to those skilled in the art that many changes can be made in the details and arrangements of steps and parts without departing from the scope of the invention as defined in the appended claims.

What is claimed is:

1. A battery-powered magnetic pen comprising:
   an elongated casing of a size adapted to be handheld and manipulated by a user;
   a battery enclosed in said casing for supplying power to operate said pen;
   an actuating rod mounted at one end of said casing for movement between first and second positions; and
   electrical circuit means enclosed in said casing, said circuit means comprising
   means including a power line and a ground for distributing power from said battery,
   a tip switch actuated in response to movement of said actuating rod between said first position and said second position,
   a pulse generator for generating a pulse in response to actuation of said tip switch each time said rod is moved between said first position and said second position,
   a selectively operated oscillator for generating and emitting a magnetic field having a frequency equal to the frequency of oscillation of said oscillator,
   a normally-open selectively-actuated second switch connected between said power line and said oscillator for connecting said oscillator to said power line and disconnecting said oscillator from said power line to respectively turn said oscillator on and off in response to closing and opening of said second switch,
   actuating means for closing said second switch and turning on said oscillator in response to a first pulse generated when said rod is moved from said first position to said second position,
   a resettable timing means for timing a time-out period of predetermined duration, said timing means being reset in response to each pulse generated while said oscillator is turned on, and
   time-out actuating means operative, in response to said timing means completing timing of a time-out period, for opening said second switch and turning said oscillator off when said actuating rod has been in said first position for a period of time equal to said time-out period and when said actuating rod has been in said second position for a period of time equal to said time-out period.

2. A battery-powered magnetic pen in accordance with claim 1 wherein said timing means comprises:
   a timing capacitor having a first side connected to said ground and a second side connected to be charged from said power line;
   and a third switch connected between said second side of said capacitor and ground, said third switch being connected to said pulse generator to receive said first pulse therefrom, said third switch being operative, in response to the start of said first pulse, to close and connect said first side to ground to thereby discharge said timing capacitor, said third switch being further operative in response to cessation of said first pulse to open, thereby allowing said timing capacitor to be recharged.

3. A battery-powered magnetic pen in accordance with claim 2 wherein said pulse generator comprises:
   a fourth switch connected between said power line and ground and having an actuating input connected to said tip switch, said fourth switch being opened and closed inversely relative to the operation of said tip switch;
   a fifth switch connected to said power line and to said third switch;
   and a second capacitor connected between said fourth and fifth switches for generating a momentary second pulse in response to actuation of said fourth switch;
   said fifth switch being operative to generate said first pulse in response to receiving said second pulse.

4. A battery-powered magnetic pen in accordance with claim 3 wherein:

said second, third, fourth, and fifth switches are transistors operated as switches, said transistors having bases for respectively receiving control signals for respectively switching said transistors on and off.

5. A battery-powered magnetic pen in accordance with claim 3 wherein said time out period is determined by the length of time it takes to recharge said first capacitor to a predetermined voltage level, after said third switch has been opened.

6. A battery-powered magnetic pen in accordance with claim 5 wherein:
said tip switch is further connected to said oscillator and is operative, in response to being opened and closed during manipulation of said pen, to cause said oscillator to modulate between a contact frequency and a proximity frequency so long as the voltage on said first capacitor is below said predetermined voltage level.

7. A battery-powered magnetic pen in accordance with claim 3 wherein the width of said second pulse is determined by the time contant of said second capacitor, said pulse width of said second pulse is sufficietly long to enable said first capacitor to be completely discharged.

* * * * *